United States Patent [19]

Royce

[11] 4,139,931
[45] Feb. 20, 1979

[54] ASSEMBLY METHOD FOR FIRE HYDRANTS

[75] Inventor: John H. Royce, Traverse City, Mich.

[73] Assignee: Waterous Company, St. Paul, Minn.

[21] Appl. No.: 837,397

[22] Filed: Sep. 28, 1977

Related U.S. Application Data

[62] Division of Ser. No. 710,235, Jul. 30, 1976, Pat. No. 4,073,307.

[51] Int. Cl.² .......................... B23P 15/00; B23P 7/00
[52] U.S. Cl. .................................. 29/157.1 R; 29/450; 29/401 F; 403/14
[58] Field of Search .............. 29/157.1 R, 450, 401 F; 403/13, 14; 251/175, 210, 332, 333, 334, 360, 362, 363, 365; 137/283, 284, 307, 516.25, 516.27, 516.29

[56] References Cited

U.S. PATENT DOCUMENTS

| 200,121 | 2/1878 | Austin | 137/395 |
|---|---|---|---|
| 645,223 | 3/1900 | Bashline | 251/362 |
| 673,666 | 5/1901 | Sullivan | 137/252 |
| 1,061,556 | 5/1913 | Osborne | 251/210 |
| 1,278,487 | 9/1918 | Lofton | 251/210 |
| 1,604,463 | 10/1926 | McKenzie | 137/272 |
| 1,616,742 | 2/1927 | Derby | 251/360 |
| 1,671,139 | 5/1928 | Wilson | 251/363 |
| 1,671,140 | 5/1928 | Wilson | 251/334 |
| 2,915,292 | 12/1959 | Gross | 165/76 |
| 2,980,125 | 4/1961 | Grant et al | 137/283 |
| 3,027,907 | 4/1962 | Lee | 137/516.29 |
| 3,054,422 | 9/1962 | Napolitano | 137/509 |
| 3,075,547 | 1/1963 | Scaramucci | 137/516.29 |
| 3,185,487 | 5/1965 | Haessler | 277/20 |
| 3,219,311 | 11/1965 | Siver | 251/86 |
| 3,356,104 | 12/1967 | Canalizo | 137/516.29 |
| 3,434,694 | 3/1969 | Skinner | 29/157.1 R |
| 3,793,690 | 2/1974 | Wayne | 29/434 |
| 3,980,096 | 9/1976 | Ellis et al. | 137/283 |
| 3,980,097 | 9/1976 | Ellis | 137/283 |
| 4,047,275 | 9/1977 | Bake et al. | 29/157.1 R |

*Primary Examiner*—C. W. Lanham
*Assistant Examiner*—Daniel C. Crane
*Attorney, Agent, or Firm*—Price, Heneveld, Huizenga & Cooper

[57] ABSTRACT

The specification discloses a fire hydrant and valve assembly therefor including a flexible, resilient compressible, fluid-impervious sealing flange or lip formed on and extending outwardly of the main valve sealing member for supplemental sealing of both the water passageway through the main valve seat ring and between the valve seat ring and inner surface of the hydrant conduit.

Also disclosed is a method for assembling a valve assembly in a fire hydrant to prevent damage to the valve assembly by using the sealing flange or lip on the sealing member to locate and guide the valve assembly through the valve seat area of the conduit as well as to lubricate that area during insertion of the valve to ease assembly and facilitate later disassembly.

7 Claims, 7 Drawing Figures

ASSEMBLY METHOD FOR FIRE HYDRANTS

CROSS-REFERENCE TO RELATED APPLICATION

This is a division of application Ser. No. 710,235 filed July 30, 1976, now U.S. Pat. No. 4,073,307.

BACKGROUND OF THE INVENTION

This invention relates to fire hydrants and, more particularly, to a valve assembly for the main valve of a fire hydrant which provides a supplemental seal for the main valve as well as a means for assembling a fire hydrant without damage to the valve apparatus.

Conventional fire hydrants typically include an elongated conduit having nozzle outlets thereon and projecting from the ground in which is mounted an elongated rod for operating a main valve to close off water from a supply line well below ground level. The main valve typically includes a sealing member bearing against a brass valve seat ring or other member threadedly secured within the barrel of the hydrant below ground level. A common and reoccurring problem with conventional hydrant structures is the failure of the sealing member and/or seat member from age, deterioration or the like necessitating replacement of the sealing member. In order to replace the member, it is necessary to unscrew the valve seat ring which in many cases has become corroded and extremely difficult to remove. Such corrosion results from exposure to water from normal hydrant usage and/or any leakage of water past conventional sealing points between the inside of the conduit of the hydrant and the valve seat ring.

Not only can water leak past the seal between the valve seat ring and conduit to cause corrosion of the valve seat ring as mentioned above, but failure or deterioration of either this seal or the main seal of the main sealing member against the valve seat ring causes the hydrant to fill with water above ground level. When this occurs in winter or freezing conditions, fracture or other damage to the hydrant could result. Consequently, both of the above-mentioned seals in a conventional fire hydrant must function to prevent such leakage and damage.

For replacement of the conventional seals as mentioned above, it is necessary that the hydrant be disassembled and then reassembled when in place in the ground. Because the valve seat ring is typically threaded into position and because the main sealing member must pass through a narrow, threaded portion of the hydrant conduit to allow the seat to be threaded into place, damage can occur to parts of the main valve when lowering the valve assembly into position below ground level from above. Such damage can include galling or peeling of the sealing O-rings on the valve seat ring, stripping or gouging of the threads in the cast iron barrel or on the brass seat ring, and/or difficulty in obtaining proper seating of the sealing O-rings.

The present valve assembly provides a supplemental seal which cooperates with the other seals to ensure sealing against and provide a solution for the above sealing problems as well as providing a means for guiding and facilitating the reassembly of a hydrant when replacement of the seals or other maintenance is necessary.

SUMMARY OF THE INVENTION

The present invention is a fire hydrant and valve apparatus especially adapted for use in fire hydrants including a supplemental seal which both completely closes the hydrant from passage of water therethrough as well as closing or sealing off the valve seat ring or other valve seat apparatus from the water supply to reduce and/or prevent corrosion thereof. The supplementary fluid seal is included on a valve within the hydrant water conduit. The valve opens and closes the conduit to or from a supply of water provided from a connection means to the conduit. The valve includes a valve seat member which, in the preferred embodiment, is an annular, externally threaded ring, with a fluid passage therethrough secured within an inner surface portion of the conduit. First sealing means are provided for preventing fluid flow between the valve seat member and the inner conduit surface as well as second sealing means for closing the fluid passageway of the valve seat member. The supplementary fluid seal is a third sealing means on the second sealing means for engaging both the valve seat member and the inner conduit surface to close the valve seat passageway as well as seal off fluid from the valve seat.

In the preferred embodiment, the second sealing means is a generally flat or disc-like flexible, resilient, compressible, fluid-impervious member typically formed from Nordel rubber including a beveled or chamfered upper edge engaging a similarly chamfered lower edge of the valve seat member. The third sealing means includes an annular flange or lip formed in one piece with the disc-like second sealing means from the same flexible, resilient, compressible and fluid-impervious material. The flange or lip extends outwardly from the periphery of the scecond sealing means, defines an area substantially matched to the inner sealing surface of the conduit and is engaged against the inner conduit sealing surface and the valve seat member when the second sealing means is closed to accomplish the above-mentioned sealing functions.

The invention also includes a method for assembling a fire hydrant for protecting valve portions thereof including the steps of inserting a main valve assembly into the conduit of a hydrant with a sealing disc or member on the main valve assembly being passed through an open end of the barrel ahead of the valve seat member on the main valve assembly. The method includes guiding the main valve assembly through the reduced diameter valve seating area of the conduit with the flexible, resilient, compressible flange on the sealing disc which provides the supplemental fluid seal mentioned above when closed. The flange locates and centers the main valve assembly to prevent damage to the other sealing means or valve seat during such assembly. The method also includes applying a lubricant to the valve seat area with the flange or lip during assembly.

The present invention provides significant advantages over prior known hydrants and valve assemblies for hydrants. The third sealing means provides a supplemental fluid seal protecting against failure of any of the conventional sealing points typically included in the main valve area of a fire hydrant. The third sealing means, therefore, prolongs the life of the valve assembly reducing the frequency of service required for the hydrant. Location of the third sealing means ahead of the valve seat area and virtually all parts which might become corroded in the valve assembly also prolongs the life of the valve by preventing water from corroding those parts during the long service period typically required for a hydrant. Moreover, the supplemental fluid seal simultaneously provides a dual sealing function unlike previous hydrant valves, namely, closing off the water supply to the barrel of the hydrant and sealing off the valve seat area to protect the valve seat ring and its connection to the barrel.

The supplemental fluid seal also provides advantages in the method of assembly of the hydrant. When the main valve assembly is lowered into the hydrant barrel for reassembly, the annular, supplementary sealing flange guides the valve apparatus into position and through the narrowed or constricted portion of the barrel to prevent damage to the valve apparatus. Use of the lip flange or supplemental seal to apply lubricant during such assembly also eases the compression of the other sealing rings normally used in the valve assembly and facilitates their proper seating.

These and other objects, advantages, purposes and features of the invention will become more apparent from a study of the following description taken in conjunction with the drawings.

DESCRIPTION OF THE PREFERRED EMBODIMENTS

Figures 1, 2, 3, 5:
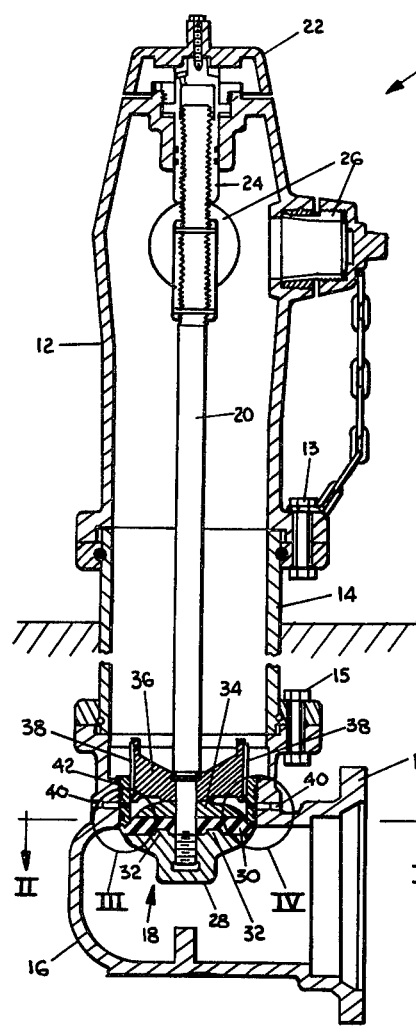
FIG. 1 is a sectional elevation of a fire hydrant and valve apparatus embodying the present invention.
FIG. 2 is a fragmentary, sectional plan view taken along the top surface of the main valve sealing disc and plane II—II of FIG. 1.
FIG. 3 is an enlarged, fragmentary view of area III of FIG. 1 illustrating the sealing member including the supplemental fluid seal of the present invention in closed position.
FIG. 5 is a fragmentary sectional view of a second embodiment of the fire hydrant and valve apparatus therefor including the present invention.

Referring now to the drawings in greater detail, FIG. 1 illustrates a fire hydrant 10 including the present invention. Hydrant 10 is an elongated conduit including a head 12 seated on and bolted with bolts 13 to a generally cylindrical barrel 14 which projects into the ground and extends to a distance below the frost level in the ground for the area or region in which the hydrant is used. Seated on and bolted to the lower end of barrel 14 with bolts 15 is a lower barrel or base 16 which extends first downwardly parallel and coaxial with the barrel 14 and then extends at right angles to barrel 14 and includes a flange 17 for connection to a water line for supplying water pressure to the hydrant.

Within the lower barrel section 16 is positioned a main valve assembly 18 for opening and closing barrel 14, 16 to allow water to flow to the head 12 of the hydrant. Valve assembly 18 is mounted on the lower end of a control rod or stem 20 which in turn is moved axially by operating nut 22 via a threaded connection 24 within the upper end of the head 12. Rotation of the operating nut 22 in one direction lowers main valve assembly 18 away from its valve seat allowing water to flow to head 12 and outwardly to fire hoses which may be connected at nozzles 26. Rotation of the operating nut 22 in the opposite direction draws valve assembly 18 upwardly closing off the passageway through the barrel and thus the water supply to the head 12 and nozzles 26.

Figure 4:
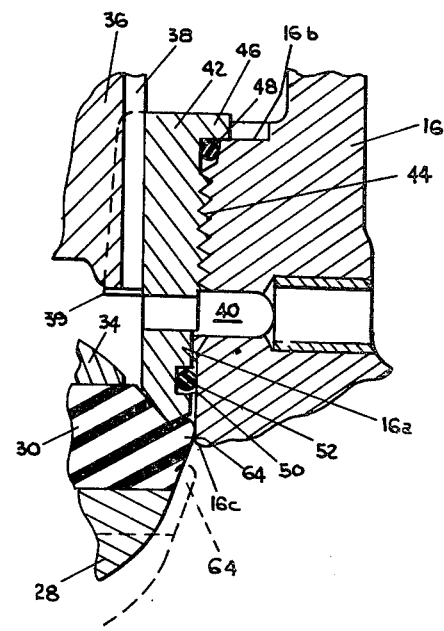
FIG. 4 is an enlarged fragmentary view of area IV of FIG. 1 illustrating the sealing member, valve seat ring, and supplemental seal as well as the O-ring sealing members for the valve seat ring.

As is best seen in FIGS. 2–4, the essence of the invention lies in the sealing arrangement and assembly method of the main valve apparatus 18. Main valve 18 includes a lower washer 28 having a central threaded bore for threadedly securing the washer to the lower end of control rod 20. Immediately above, telescoped over rod 20, and in engagement with washer 28 is a sealing disc 30 including at least a pair of recesses in its lower surface receiving projections 32 extending upwardly from washer 28 to locate and prevent rotational movement of the sealing member with respect to the washer. Immediately above and also telescoped over rod 20 are an upper washer 34 and a bronze drain valve 36.

Drain valve 36 is vertically retained in place on rod 20 by a cotter key or the like and includes vertically extending apertures therethrough and sealing members 38. The faces of sealing members 38 slide over, cover and seal the openings to drain passageways 40 when the rod 20 and valve apparatus 18 is raised and lowered to open the main valve. The sealing faces of drain valve 36 are located and prevented from rotation by pairs of spaced projections 39 extending radially inwardly from the inside surface of valve seat ring 42 as shown in FIG. 4. Hence, any water left in the head or barrel of the hydrant flows downwardly through drain valve 36 when main valve 18 is in its up and closed position and outwardly through passages 40 on either side of the hydrant. This removes any water from the barrel or head of the hydrant which could freeze and damage the hydrant in cold weather or rust and corrode the interior of the hydrant.

As is best seen in FIGS. 3 and 4, the sealing function of main valve assembly 18 and especially the sealing member 30 takes place in cooperation with valve seat ring 42 and the valve seat area comprising a narrowed surface or constricted passageway 16a within the conduit or barrel 16 of the hydrant. Valve seat ring 42 is preferably formed from brass to retard corrosion and is generally a cylindrical ring which is externally threaded at 44 immediately below a radially extending annular flange 46 forming a right angle corner for receipt of a sealing O-ring 48 as shown in FIG. 4. Immediately below radially extending apertures in the lower portion of ring 42 which form a portion of the drain passageways 40 is an annular recess 50 on the external side of the ring. An annular O-ring 52 is seated in recess 50 for additional sealing between the valve seat ring and surface 16a. The lower edge of the seat ring 42 includes an annular, interior, beveled surface 54 generally facing inwardly and downwardly and an external, beveled, annular surface 56 generally facing outwardly and downwardly. When threaded into position with flange 46 seated against surface 16b of barrel 16 and threads 44 engaging the threaded portion of the constricted or narrowed area of barrel 16, flexible, resilient fluid-impervious annular O-rings 48, 52 prevent water flow past the valve seat ring between the seat ring and the narrow sides.

As is best seen in FIGS. 2–4 and 7, sealing member or disc 30 is generally a flat, disc-like member having planar upper and lower surfaces and formed from resilient, flexible, compressible, fluid-impervious material such as Nordel rubber. The upper, outer edge portion 60 is beveled to provide an annular surface which engages surface 54 of seat ring 42 when valve assembly 18 is closed. On the outer circumferential edge or periphery 62 of disc 30 is integrally formed in one piece the supplemental sealing flange or lip 64 separated from the periphery 62 by an annular groove or recess 66. Flexible, resilient lip 64 includes a rounded surface 68 extending in the axial direction toward the side of the disc on which the beveled surface 60 is located. A flat, annular surface 70 having a width "B" shown in FIG. 7 and lying in a plane parallel to the central axis of the disc is formed on the circumference of the disc. The outer edge of the disc 30 tapers upwardly and outwardly along surface 72 to merge with the annular flat circumferential surface 70 below flange 64 to provide support and strength for the flexible lip on disc 30.

As will be best seen in FIG. 4, in its free and uncompressed state, lip flange 64 on disc 30 has an outside diameter on circumferential surface 70 designed to substantially match and be equivalent to the inside diameter of valve seat area 16a of barrel or conduit 16. In operation, when sealing disc 30 is drawn upwardly by rod 20, beveled surface 60 engages correspondingly beveled surface 54 of valve seat 42 to provide a main seal against passage of water through valve seat ring 42. Supplemental sealing functions are also provided when disc 30 is closed, namely, contact of the rounded, axially extending surface of flange 64 with the other beveled surface 56 of seat 42 and simultaneous contact of circumferential surface 70 with surface 16a of barrel or conduit 16. As sealing member 30 is drawn upwardly, the outward angle of beveled surface 56 helps force lip 64 against surface 16a. Water is thus prevented by lip 64 from passing either interior of or exterior to valve seat ring 42. Water pressure entering from connection 17 against the main valve helps to increase the sealing effect of the lip flange 64 by pushing against surface 72 and the lip flange itself to tightly engage surfaces 68 and 70 with surfaces 56, 16a respectively. Annular groove 66 allows the lip 64 to flex while the resiliency of the fluid-impervious sealing material helps urge the lip into sealing engagement.

This flexibility also allows proper seating of the sealing disc upon closing of the valve as shown in FIG. 4. Should the lip 64 be extended outwardly beyond the surface 16a by water pressure, slight oversize, or the like, the rounded lip will contact the beveled or chamfered surface 16c (FIGS. 3 and 4) on the bottom of the narrowed or constricted area 16a of barrel 16 to compress the lip inwardly so that it will slide upwardly along the axially extending wall surface 16a into position against surface 56 and wall surface 16a. Accordingly, flange 64 not only prevents water from passing through the internal passageway of valve seat ring 42 as a supplement to the sealing contact between beveled surface 60 and surface 54 of ring 42, but also seals off any fluid or water passage between valve seat ring 42 and the inside surface of the barrel or conduit 16. Since lip 64 is upstream of the entire ring 42, corrosion of that ring is reduced and/or prevented when lip 64 is in its closed position.

Figure 6:
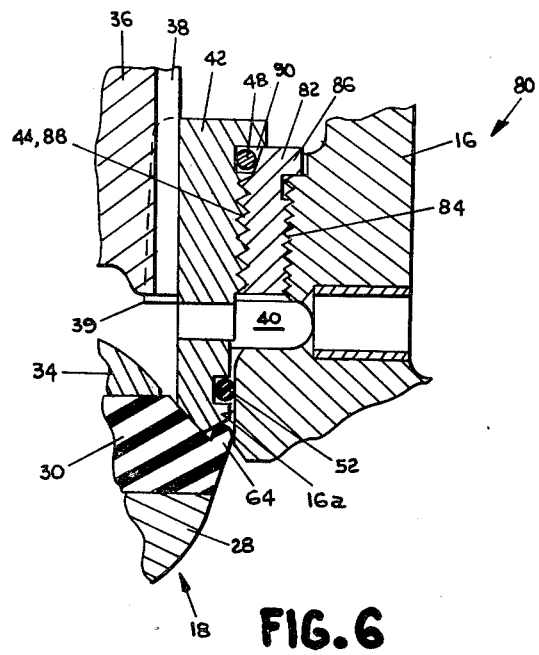
FIG. 6 is an enlarged, fragmentary sectional view of area VI of FIG. 5.
Figure 7:
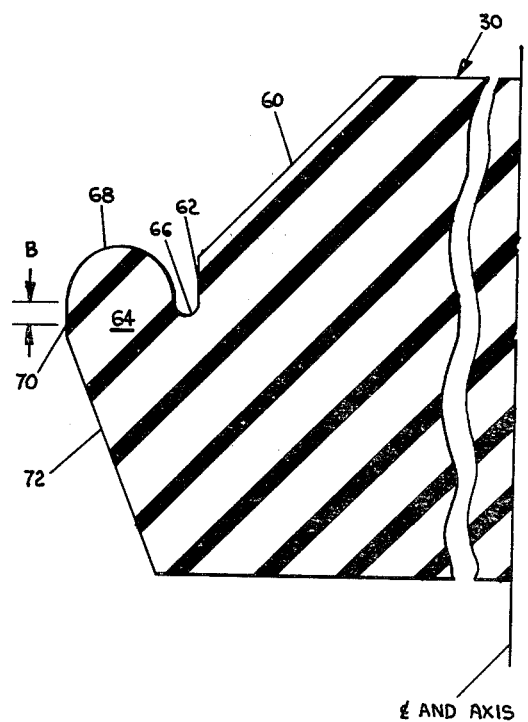
FIG. 7 is an enlarged, fragmentary, broken view of the main valve sealing disc including the supplemental fluid seal flange or lip.

As shown in FIGS. 5 and 6, the main valve assembly 18 may also be used in a slightly varying embodiment 80 of the hydrant which is designed for further protection against corrosion and to ease later maintenance and disassembly of the hydrant. In embodiment 80, a second valve seat ring 82 is utilized intermediate the inside surface of barrel or conduit 16 and the main valve seat ring 42. Ring 82 is also formed from brass and is designed to be permanently installed in the hydrant conduit with its externally threaded portion 84 engaging threads on the inside of the conduit and its flange 86 seating against an annular shoulder of the conduit. The inside surface of the cylindrical ring 82 is also threaded at 88 to receive the threads 44 of the externally threaded main valve seat ring 42. In the case of embodiment 80, O-ring 52 bears against the same surface 16a of barrel or conduit 16 as in embodiment 10 while O-ring 48 on main valve seat ring 42 bears against a beveled surface 90 immediately above threads 88 on intermediate ring 82. The remaining portions of embodiment 80 are exactly similar to those described above for embodiment 10. The intermediate ring 82 provides brass-to-brass contact allowing easier removal of main valve seat ring 42 for later service of the hydrant and/or replacement of the disc 30.

As will now be understood from the drawings, should replacement of the sealing member 30 be necessary after the hydrant has been in use for a long service period, line water pressure must be shut off to enable disassembly and removal. Head 12 is unbolted and removed from barrel 14 and a large annular wrench is dropped over the control rod 20 and engaged in specially provided lugs on the valve seat ring 42. Rotation of the wrench unscrews valve seat 42 enabling the entire valve assembly 18 to be lifted out of barrel sections 14, 16 to be worked on at ground level. The sealing member 30 is replaced by removing the cotter key holding drain valve 36 in place and slipping drain valve 36, upper washer 34 and the sealing disc off the upper end of the rod 20. Thereafter, these parts including a new valve sealing member 30 are reassembled on the rod 20 in reverse order and the cotter pin made fast.

With the supplemental sealing lip flange 64 present on the valve sealing member 30 as described above, reassembly of the main valve apparatus 18 in the barrel of the hydrant is now possible without damaging O-rings 48, 52 or external threads 44 of the valve seat ring. The entire assembly is dropped down into barrel 14 with the peripheral circumference 70 of lip flange 64 first contacting the upper threaded portion of surface 16a of barrel 16 or threads 88 on the internal surface of intermediate sealing ring 82. Such contact with lip flange 64 centers and locates the valve assembly 18 within the threaded portion and guides the assembly through the constricted narrow portion of the barrel until the external threads 44 of valve seat ring 42 contact the threaded portion of the barrel 16 or ring 82. The wrench engaging ring 42 is then rotated to secure ring 42 in place. Such guidance through the constricted or narrow portion prevents galling, peeling or other damage to the O-rings 48, 52 or damage to the soft brass threads 44 on ring 42 as they are positioned.

In addition, the method also enables easier compression and seating of O-ring 52 against surface 16a if a lubricant such as grease is applied to the outer surface 70 of flange 64 prior to the above-described reassembly. With the application of such a lubricant, lowering of the valve assembly with flange 64 through the constricted or narrow portion of the barrel applies or coats the lubricant or grease along the threaded portion of the barrel and surface 16a such that when the O-ring 52 contacts that coated surface, the O-ring will slide easily into its seated and compressed position in recess 50. The application of such lubricant to the threads also enables easier securement of the valve seat ring and facilitates removal of the ring by helping to prevent corrosion of the ring to the barrel or to intermediate ring 82 should later service be necessary.

The sealing member 30 including supplemental sealing lip flange 64 has been tested in a hydrant with conventional O-rings 48 and 52 removed from the assembly. Water pressures of between 50 and 400 psi were applied from below the main valve, i.e., from the direction of connection 17, and it was found that no water leakage past ring 42, either externally or internally, occurred. In conventional designs, removal of an O-ring between the valve seat ring 42 and the barrel would allow the head of the hydrant to fill with water causing the damage mentioned above.

Accordingly, the present invention provides significant sealing advantages over conventional hydrant designs as well as an improved method for assembling hydrants after service or repair. The method prevents damage to the valve seat members and sealing rings to enable longer periods between servicing.

While several forms of the invention have been shown and described, other forms will now be apparent to those skilled in the art. Therefore, it will be understood that the embodiments shown in the drawings and described above are merely for illustrative purposes and are not intended to limit the scope of the invention which is defined by the claims which follow.

I claim:

1. A method for assembling a fire hydrant while protecting valve portions thereof comprising the steps of:
   (1) providing a water conduit for the hydrant and valve means for insertion within said conduit to open and close the conduit for controlling water flow therethrough, said conduit including a valve-receiving means for receiving said valve means, said valve means including a valve seat member for insertion in said valve-receiving means, a sealing member, and means for moving said sealing member into and out of contact with said valve seat member and valve-receiving means of said conduit; and
   (2) inserting said valve means through an opening at one end of said conduit and passing portions of said valve means including said sealing member into and through the entirety of said valve-receiving means while guiding other portions of said valve means into said valve-receiving means with a flexible, resilient, compressible, fluid-impervious flange having a cross-sectional area larger than the remainder of said valve means, said flange being on and extending around the periphery of said sealing member whereby damage to the said portions of said valve means other than said flange is reduced.

2. The method of claim 1 wherein said flange has a cross-sectional area substantially matched to the area of said valve-receiving means of said hydrant conduit while said valve seat member includes portions to be received in said valve-receiving means which have a cross-sectional area smaller than said flange; said insertion step including passing said portions of said valve means including said sealing member and flange through said valve-receiving means with said sealing member and flange ahead of the said portions of said valve seat member, said flange contacting said valve-receiving means to locate and center said valve means to reduce contact of said valve seat member and any sealing means thereon with said valve-receiving means.

3. The method of claim 2 including applying a lubricant to said flange prior to its insertion and inserting said valve means in said conduit such that lubricant is applied to said valve-receiving means with said flange during insertion whereby insertion and compression of sealing means on said valve seat member following said flange and later removal of said valve seat member is facilitated.

4. The method of claim 2 wherein at least a portion of said valve-receiving means includes threads for securing said valve seat member, said valve seat member including an annular sealing ring therearound; said guiding step including contacting said threaded portion of said valve-receiving means with said flange to prevent galling and/or peeling of said annular sealing ring of said valve seat member on said threads.

5. The method of claim 1 including applying a lubricant to said flange prior to its insertion and inserting said valve means in said conduit such that lubricant is applied to said valve-receiving means with said flange during insertion whereby insertion and compression of sealing means on said valve seat member following said flange and later removal of said valve seat member is facilitated.

6. A method for assembling a fire hydrant while protecting valve portions thereof comprising the steps of:
   (1) inserting a main valve assembly into the conduit of a hydrant with a sealing disc on said main valve assembly being passed through an open end of said conduit ahead of a valve seat member on said main valve assembly;
   (2) guiding said main valve assembly through said conduit by passing portions of said main valve assembly including said sealing disc into and entirely through a reduced diameter valve seating area of said conduit with a flexible, resilient, compressible flange on said sealing disc, said flange being formed on the periphery of said sealing disc and having a diameter substantially matched to that of said valve seating area of said conduit and larger than both the remainder of said main valve assembly and the portions of the valve seat member to be received in said valve seating area, said flange locating and centering said main valve assembly as it is passed into and through said valve seating area to reduce contact of said valve seat member and any sealing means thereon with said valve seating area and thus damage thereto during assembly.

7. The method of claim 6 including applying a lubricant to said flange prior to insertion in said conduit and inserting said valve assembly with said flange in said conduit and through said valve seating area such that lubricant is applied to said valve seating area during insertion whereby insertion and compression of sealing means on said valve seat member following said flange and lateral removal of said valve seat member is facilitated.

* * * * *

UNITED STATES PATENT AND TRADEMARK OFFICE
CERTIFICATE OF CORRECTION

PATENT NO. : 4,139,931
DATED : February 20, 1979
INVENTOR(S) : John H. Royce

It is certified that error appears in the above-identified patent and that said Letters Patent are hereby corrected as shown below:

Column 7, lines 1-3

"I claim:" should be -- The embodiments of the invention in which an exclusive property or privilege is claimed are defined as follows. --

Signed and Sealed this

Tenth Day of July 1979

[SEAL]

Attest:

*Attesting Officer*

LUTRELLE F. PARKER
*Acting Commissioner of Patents and Trademarks*